United States Patent Office 3,798,267
Patented Mar. 19, 1974

3,798,267
PROCESS OF PRODUCING ACETIC ACID FROM METHYL FORMATE
Hachiro Wakamatsu, Tokyo, Jiro Sato, Yokohama, and Tatsunori Hamaoka, Hayama, Japan, assignors to Ajinomoto Co., Inc., Tokyo, Japan
No Drawing. Continuation-in-part of application Ser. No. 114,065, Feb. 9, 1971. This application Aug. 10, 1972, Ser. No. 279,719
Claims priority, application Japan, Feb. 25, 1970, 45/16,018; Aug. 19, 1971, 46/63,253
Int. Cl. C07c *51/00*
U.S. Cl. 260—541       7 Claims

ABSTRACT OF THE DISCLOSURE

Methyl formate is isomerized to acetic acid in the presence of activated carbon and a halogen promoter at 200° to 450° C.

---

This application is a continuation-in-part of the copending application Ser. No. 114,065, filed on Feb. 9, 1971.

As disclosed in the afore-mentioned earlier application, methyl formate can be converted to acetic acid by isomerization at elevated temperature in the presence of carbon monoxide, a catalyst furnishing rhodium carbonyl under the reaction conditions, and a halogen promoter.

It has also been disclosed earlier in British Pat. No. 628,161 that the conversion takes place in the presence of iron, nickel, or cobalt and elementary halogen in a homogeneous system.

It has now been found that methyl formate is converted to acetic acid at elevated temperature in the presence of a catalyst system consisting essentially of activated carbon and a halogen promoter. The carbon is readily separated from the gaseous or liquid starting material and product.

Neither the origin of the carbon or the activation method is critical. Activated carbon, as the term is commonly accepted, is a porous product which may be prepared from amorphous carbon by the action of steam or other reactants. The commercially available product has a surface area of 400 to 3000 m.$^2$/g. and the pore volume may amount to 0.03 to 2.5 cm.$^3$ per gram. The starting material may be charcoal of animal or vegetable origin, such as bone charcoal, coconut charcoal, or wood charcoal, or coke from coal or petroleum. While this is not critical, it is preferred that the activated carbon be washed with aqueous hydrofluoric acid (10%–30% by weight) or aqueous nitric acid at ambient temperature for 10 minutes to 24 hours, washed free of acid with water, and dried before being used in the process of the invention.

The halogen promoters used in the process of this invention include the elementary halogens and halogen compounds, particularly the hydrogen halides, the lower alkyl halides and lower alkylene dihalides having up to 4 carbon atoms, and the ammonium, phosphonium, and stibonium halides.

Suitable halogen promoters thus include chlorine, bromine, iodine, hydrogen -bromide, -iodide, methyl -chloride, -bromide, -iodide, ethyl -bromide, -iodide, propyl -bromide, -iodide, butyl -bromide, -iodide, methylene diiodide, ammonium iodide, phosphonium -bromide, iodide, and stibonium iodide.

Iodine is the preferred halogen in the promoter and may be present as the free halogen or in one of the halogen compounds enumerated above. The promoter should be present in the reaction zone in an amount of 1.0 to 0.001 halogen atom equivalent per mole of methyl formate.

The methyl formate may be present in the reaction zone either as a liquid or a gas. When the process is carried out in a liquid phase, the amount of activated carbon present in the reaction zone should be 0.01 to 10 grams per gram of methyl formate. The reaction zone is held at 200° to 450° C., and preferably at 250° to 400° C. at a pressure at which both the methyl formate and the acetic acid formed therefrom are liquid and constitute the reaction medium. Acetic acid may be added to the methyl formate as a diluent before the reaction is started.

When the reaction is carried out in the gas phase, it is preferably continuous, and the methyl formate and halogen promoter are fed to the reaction zone in the ratio indicated above, the space velocity of the methyl formate being 10 to 100,000 ml. methyl formate per milliliter carbon per hour, and preferably between 100 and 10,000 hr.$^{-1}$. Acetic acid is recovered from the gaseous effluent by condensation.

The reaction zone should preferably be free from elementary oxygen, but may contain gases inert to methyl formate, acetic acid, and the catalyst system under the reaction conditions. Suitable gases include carbon monoxide, synthesis gas, methane, nitrogen, and the noble gases of the zero group of the Periodic Table of Elements. The gases impede the decomposition of methyl formate to gaseous compounds, and thereby improve the acetic acid yield. The gases also may serve as diluents which facilitate heat transfer.

The catalyst system of the invention is effective in converting methyl formate to acetic acid at a pressure which, when reduced to room temperature (20° C.), is equal to atmospheric pressure, but the decomposition of methyl formate to carbon dioxide and other gaseous compounds other than acetic acid is more effectively impeded by an absolute pressure in the reaction zone which is at least 10 atmospheres, and preferably 30 to 1,000 atmospheres as reduced to 20° C., when the reaction is carried out in a liquid medium. In a gas phase reaction, best yields are achieved at absolute pressures of 10 to 300 atmospheres, as reduced to 20° C.

The carbon catalyst is separated from a liquid reaction mixture by any method conventional in solid-liquid separation, such as filtering or decanting, and the acetic acid may be recovered from the liquid mixture by fractional distillation. The problem of separating the carbon from the reaction mixture does not present itself in continuous operation in the gas phase since the carbon is stationary in the reaction zone.

The following examples are further illustrative of the invention.

EXAMPLE 1

An autoclave of Hastelloy-C having a capacity of 100 ml. was charged with 5 g. activated carbon which had been washed with hydrofluoric acid, 30 g. (0.5 mole) methyl formate, and 5.76 g. (0.04 mole) methyl iodide. The autoclave was then sealed and charged with carbon monoxide to a pressure of 300 atmospheres, as converted at 20° C.

The contents of the autoclave were heated quickly to 350° C. and held at that temperature for 5 minutes with shaking. The autoclave then was cooled to ambient temperature and emptied. The reaction mixture was found by gas chromatography to contain 0.716 mole acetic acid.

EXAMPLE 2

The autoclave of Example 1 was charged with activated carbon, methyl formate, and methyl iodide as in Example 1, and further with nitrogen to an absolute pressure of 100 atmospheres, reduced to 20° C. It was then heated at 310° C. for three hours with shaking, and was then cooled and emptied. The reaction mixture contained 0.101 mole acetic acid.

EXAMPLE 3

The same autoclave as in the preceding examples was charged with the same amounts of carbon, methyl formate, and methyl idodide, and was then flushed with nitrogen at ambient pressure to displace the atmospheric oxygen originally present, sealed, and heated at 310° C. for one hour with shaking.

The reaction mixture withdrawn from the cooled autoclave contained 0.011 mole acetic acid.

EXAMPLE 4

In the procedure of Example 1, the carbon monoxide pressure was reduced to 50 atmospheres, the reaction time was increased to two hours, and the reaction temperature reduced to 310° C.

The reaction mixture withdrawn in liquid form from the autoclave after cooling contained 0.24 mole acetic acid.

EXAMPLE 5

A Hastelloy-C tube, 300 mm. long and 8 mm. in internal diameter, was charged with 10 milliliter (4.1 g.) activated carbon which had been washed with hydrofluoric acid. While the tube and its contents were held at 350° C., and the internal pressure was maintained at 24 atmospheres, as reduced to 20° C., methyl formate, methyl iodide, and carbon monoxide were fed to one end of the tube at respective hourly flow rates of 547, 21.8, and 1,277 millimoles.

The effluent discharged from the other end of the tube was cooled to room temperature, whereby a liquid fraction of the reaction mixture was obtained at a rate of 20 ml. per hour. It was analyzed by gas chromatography and found to contain, per 100 ml., 23.0 g. acetic acid, 5.0 g. methyl acetate, 13.2 g. methyl iodide, 50.6 g. unreacted methyl formate, 1.3 g. methanol, and 2.46 g. water.

22 g. crude acetic acid boiling at 110° to 120° C. and containing 98.7% of the pure acid, as determined by gas chromatography, was recovered from 100 ml. of the liquid fraction.

The same or similar results were achieved when methyl iodide was replaced by bromine, iodine, hydrogen-bromide, -iodide, methyl bromide, ehtyl-bromide, -iodide, propyl-bromide, -iodide, butyl-bromide, -iodide, or methylene diiodide in the continuous gas-phase reaction of Example 5, and by the halogen promoters mentioned above, ammonium iodide, phosphonium-bromide, -iodide, or stibonium iodide in the liquid phase reactions of Examples 1 to 4.

What is claimed is:

1. A process of converting methyl formate to acetic acid which comprises:
   (a) holding said methyl formate in a reaction zone at a temperature of 200° to 450° C. and an absolute pressure of one to one thousand atmospheres, as reduced to 20° C., in the presence of a catalyst system consisting essentially of effective amounts of activated carbon and a halogen bearing promoter until said acetic acid is formed,
      (1) said promoter being elementary halogen, hydrogen halide, alkyl halide having up to four carbon atoms, alkylene dihalide having up to four carbon atoms, ammonium halide, phosphonium halide, or stibonium halide; and
   (b) recovering the formed acetic acid.

2. A process as set forth in claim 1, wherein the halogen in said promoter is iodine.

3. A process as set forth in claim 2, wherein the amount of said promoter in said zone is 1.0 to 0.001 halogen atom equivalent per mole of said methyl formate.

4. A process as set forth in claim 1, wherein said methyl formate is liquid in said zone, the amount of said activated carbon being 0.01 to 10 grams per gram of said methyl formate, and the absolute pressure in said zone being 10 to 1000 atmospheres, as reduced to 20° C.

5. A process as set forth in claim 1, wherein said methyl formate is moved through said zone as a gas at a space velocity between 10 and 100,000 milliliters per milliliter of said carbon per hour, the absolute pressure in said zone being maintained at 10 to 300 atmospheres, as reduced to 20° C.

6. A process as set forth in claim 5, wherein said methyl formate is held in said zone in the presence of a gaseous diluent inert to said methyl formate, said catalyst system, and said acetic acid.

7. A process as set forth in claim 6, wherein said diluent is carbon monoxide, synthesis gas, methane, nitrogen, or a noble gas.

FOREIGN PATENTS 837,640   3/1970   Canada ............ 260—541

VIVIAN GARNER, Primary Examiner